UNITED STATES PATENT OFFICE.

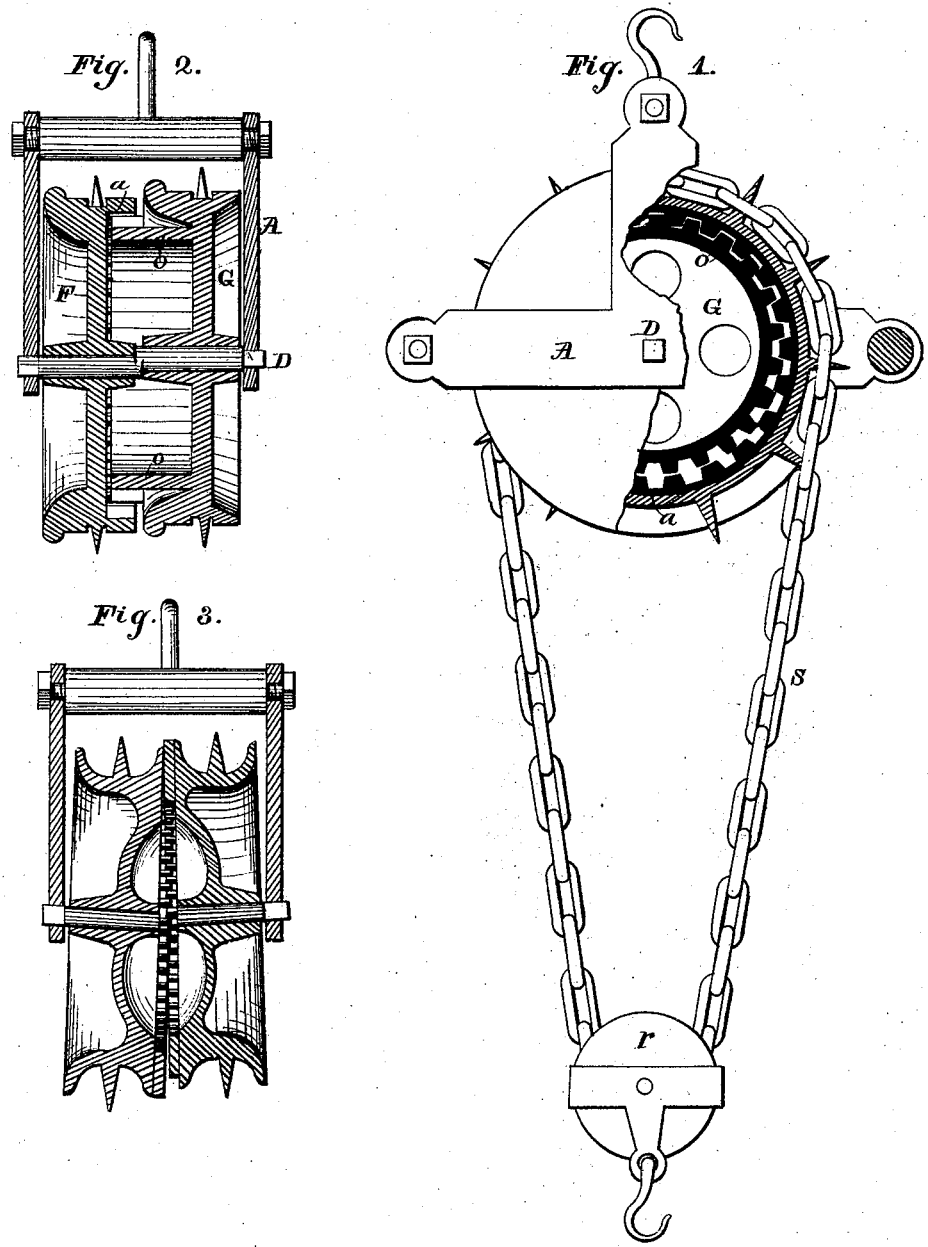

BENJAMIN ARNOLD, OF EAST GREENWICH, RHODE ISLAND.

IMPROVEMENT IN PULLEY-BLOCKS.

Specification forming part of Letters Patent No. 185,060, dated December 5, 1876; application filed September 25, 1876.

*To all whom it may concern:*

Be it known that I, BENJAMIN ARNOLD, of East Greenwich, in the county of Kent and State of Rhode Island, have invented certain Improvements in Pulley-Blocks, of which the following is a full, clear, and correct description, reference being had to the accompanying drawings.

The nature of this invention consists in making the difference in the motion of two chain-pulleys by an application of the differential gearing and eccentric invented and patented by me October 30, 1849, No. 6,821, instead of using two different-sized pulleys, as is now done for that object.

In the drawings, Figure 1 shows an elevation of the pulley-block, with a part of the frame and one pulley removed, to show the gearing inside. Fig. 2 is a vertical cross-section, taken through the center of the axle. Fig. 3 shows a modification of the invention.

A is the frame, in which the two chain-pulleys F and G are supported on the axle D. These pulleys are made with grooves on their peripheries, and points to hold the chain in the usual way, and of the same size, as the difference in motion is made by the gearing. The rim of pulley F has gear-teeth made on its inner surface, forming an internal spur-gear, $a$, and the pulley G has a rim, O, on its inner side, with external spur-gear. This rim-gear O projects into the pulley F, and that part of the axle D on which the pulley G turns is made eccentric to the other part, on which F turns, so that the teeth on the rim O will mesh into the teeth in the internal gear in F, and when one of the pulleys is turned on its axle the other will be moved also. The rim O, having a lesser number of teeth than gear $a$, the pulley G will move faster than pulley F. The ends of the axle D are squared into the holes in the frame A, or otherwise prevented from turning with the pulleys.

The arrangement of the chain S and the pulley $r$ is the same as usual.

The operation is as follows: The slack-chain coming from the pulley G being pulled so as to turn that pulley, the pulley F will be turned by means of the gearing; but as there is a greater number of teeth in the gear in pulley F than there is in the rim-gear O, when the pulley G has made a whole revolution the pulley F will not have made one, but will lack the number of teeth difference in the gears; consequently, the pulley G will have taken up more chain than the pulley F has let out, and the weight attached to the pulley $r$ is raised.

If there are fifty teeth inside of the pulley F and forty-nine on the rim O, the gain or leverage of the pulleys will be as fifty to one, which, being doubled by the pulley $r$ in the bight of the chain, gives a lifting power of one hundred to one, minus that taken up in overcoming the friction. The great number of teeth always in gear makes the connection between the two pulleys very strong, and capable of sustaining any strain that the rest of the apparatus will bear, and as the gear can be cast on and in the pulleys the increase in cost is very small.

In Fig. 3 the gear-teeth are made on the inner faces of the pulleys instead of being put as in Fig. 2, and the two halves of the axle are made inclined to each other as well as eccentric, as in Fig. 2, so as to bring the pulleys together on one side, and apart on the other, that the gear-teeth may interlock on one side and clear each other on the other. The operation and the effect are the same as in the plan shown in Fig. 2.

What I claim as my invention is—

The combination of the two pulleys F G, provided with projections to hold a chain, with the two gears $a$ O, stationary eccentric axle D, endless chain S, and lower pulley $r$, constructed and operating substantially as herein set forth.

BENJ. ARNOLD.

Witnesses:
H. A. ARNOLD,
M. A. HOUGHTON.